United States Patent
Boffelli et al.

(10) Patent No.: US 6,468,163 B1
(45) Date of Patent: Oct. 22, 2002

(54) DEVICE FOR TRANSMITTING THE MOVEMENT FOR MOTOR-VEHICLE FANS WITH A FRONT-LINKAGE INDUCTION COUPLING

(75) Inventors: Piercarlo Boffelli, Milano; Fabio Natale, San Donato Milanese; Erminio Depoli, Crema; Claudio Bellotti, Cerro Al Lambro, all of (IT)

(73) Assignee: Baruffaldi S.p.A., San Donato Milanese (IT)

(*) Notice: Subject to any disclaimer, the term of this patent is extended or adjusted under 35 U.S.C. 154(b) by 0 days.

(21) Appl. No.: 09/441,777

(22) Filed: Nov. 17, 1999

(30) Foreign Application Priority Data

Nov. 19, 1998 (IT) .......................... MI98A2510

(51) Int. Cl.⁷ .......................... F16D 27/00; H02K 49/00
(52) U.S. Cl. .................. 464/29; 310/103; 192/84.96
(58) Field of Search ................. 310/103, 105, 310/92; 464/29; 192/84.96

(56) References Cited

U.S. PATENT DOCUMENTS

| | | | | |
|---|---|---|---|---|
| 2,449,888 A | * | 9/1948 | Edwards ...................... | 464/29 |
| 3,092,984 A | * | 6/1963 | Kramer et al. ................. | 464/29 |
| 3,314,512 A | * | 4/1967 | Kerestury ..................... | 464/29 |
| 3,368,657 A | * | 2/1968 | Wrensch et al. ........... | 192/84.96 |
| 3,382,385 A | * | 5/1968 | Baudot .......................... | 464/29 |
| 3,458,122 A | * | 7/1969 | Andriussi et al. ............ | 310/105 |
| 3,627,445 A | * | 12/1971 | Andriussi .................... | 310/105 |
| 3,733,504 A | * | 5/1973 | Dennis ......................... | 310/105 |
| 3,822,390 A | * | 7/1974 | Janson ........................ | 310/104 |
| 3,924,585 A | * | 12/1975 | Woods .................... | 192/84.96 |
| 4,065,234 A | * | 12/1977 | Yoshiyuki et al. ..... | 192/84 PM |
| 4,119,184 A | * | 10/1978 | Mower et al. ........... | 192/84.96 |
| 4,285,421 A | * | 8/1981 | Halsted .................... | 192/84.96 |
| 4,476,744 A | | 10/1984 | Crooks | |
| 4,926,992 A | | 5/1990 | Linnig | |
| 5,148,902 A | * | 9/1992 | Nakamura ............... | 192/84.96 |
| 5,212,419 A | * | 5/1993 | Fisher et al. ................ | 310/216 |
| 5,238,095 A | * | 8/1993 | Pedu .......................... | 310/105 |
| 5,586,636 A | | 12/1996 | Linnig | |
| 5,739,627 A | * | 4/1998 | Lamb .......................... | 310/92 |
| 5,903,075 A | * | 5/1999 | Lamb .......................... | 310/105 |
| 6,007,303 A | * | 12/1999 | Schmidt .................. | 192/84.93 |
| 6,129,193 A | * | 10/2000 | Link .......................... | 310/103 |

FOREIGN PATENT DOCUMENTS

| | | |
|---|---|---|
| DE | 470 057 | 12/1928 |
| DE | 34 43 523 | 6/1986 |
| DE | 42 07 709 | 9/1993 |

* cited by examiner

*Primary Examiner*—Lynne H. Browne
*Assistant Examiner*—Kenn Thompson
(74) *Attorney, Agent, or Firm*—Herbert Dubno

(57) ABSTRACT

A device for transmitting the movement to a fan (1) cooling the cooling liquid of a motor vehicle, comprising movement generating means (2;2a,2b) on which the fan (1) is mounted by means of an idle support (1a), characterized in that it comprises an induction coupling (10) with a front-linkage electromagnetic operating system (11a,11b) having a conducting element (15;115) integral with said fan (1,1a).

15 Claims, 4 Drawing Sheets

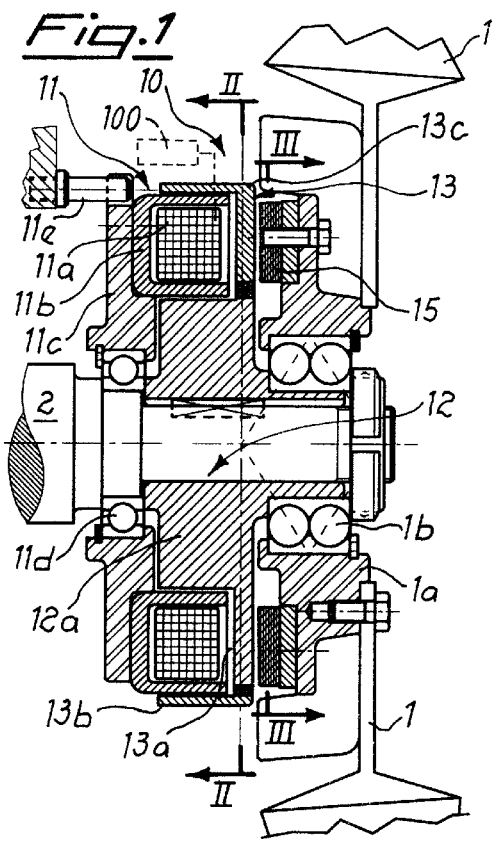
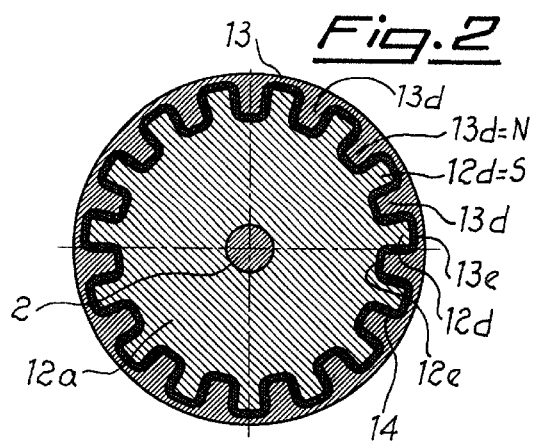
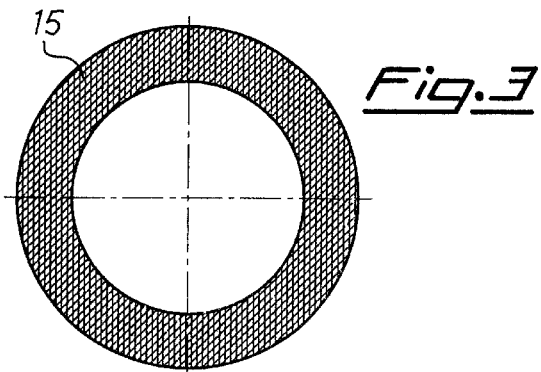
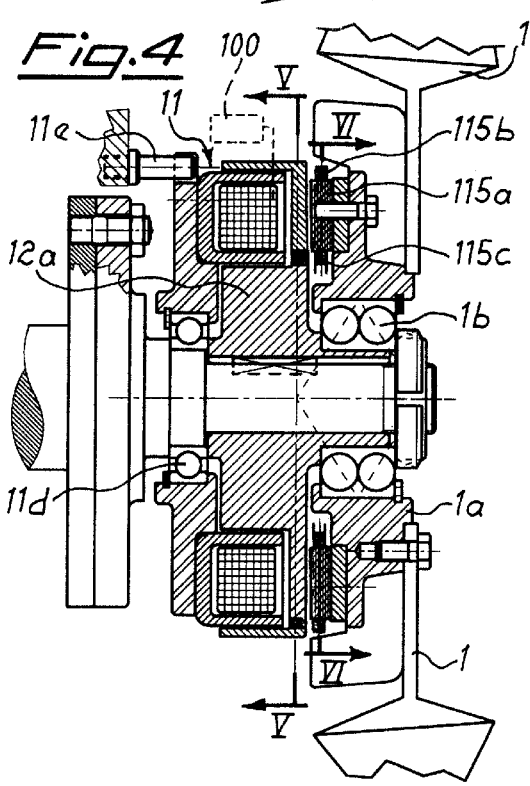
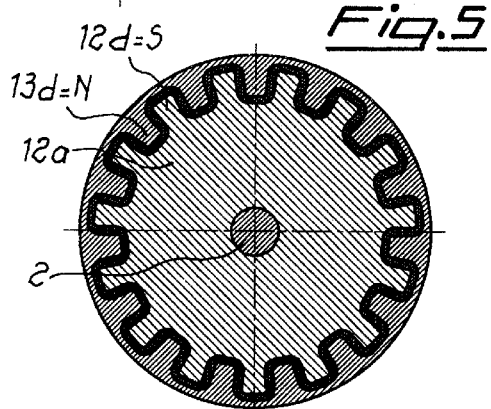
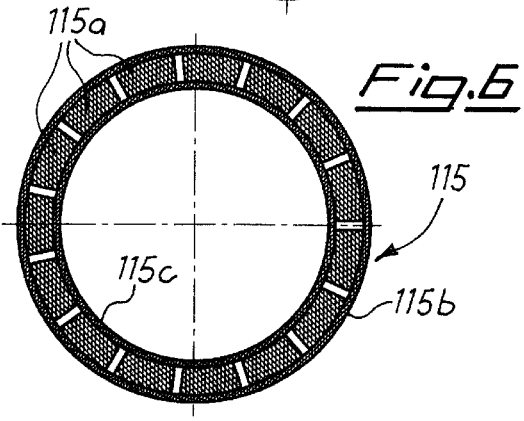

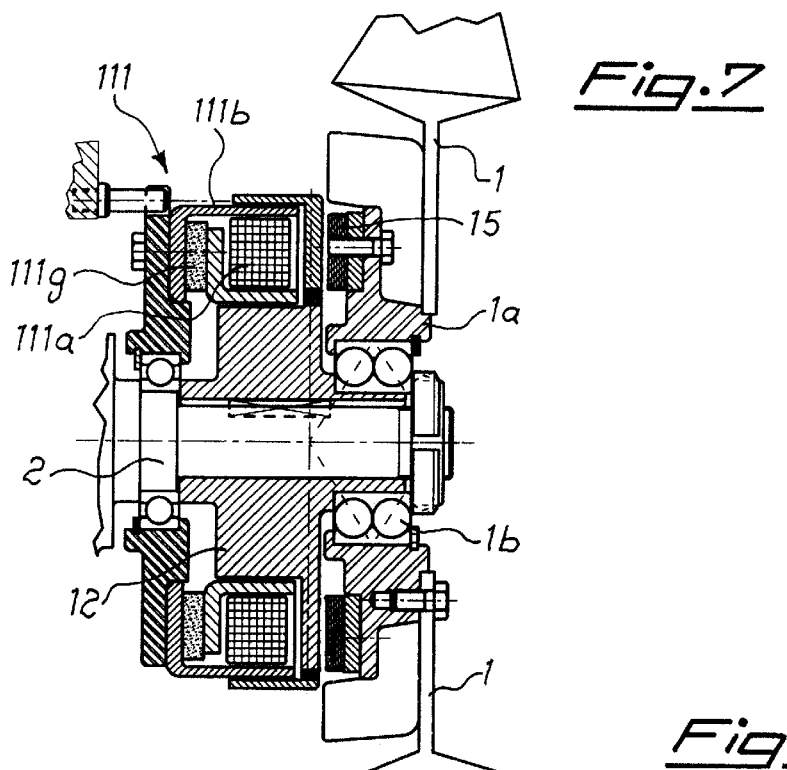
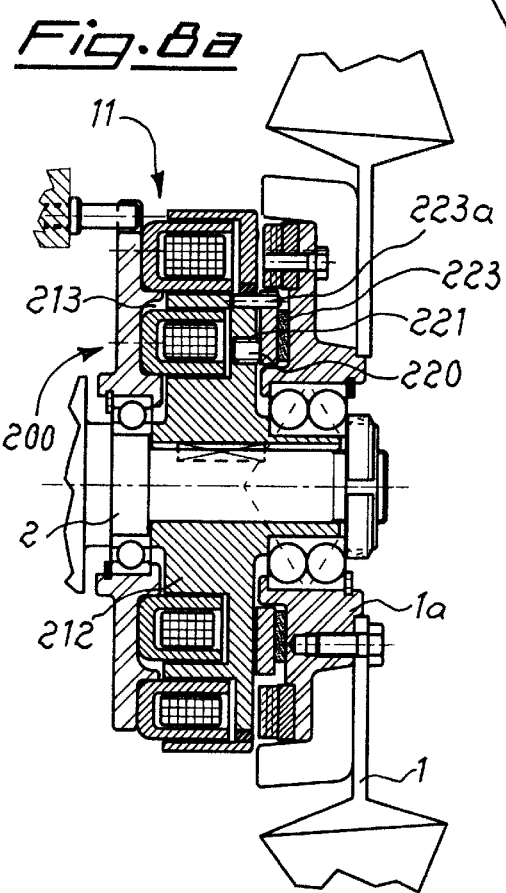
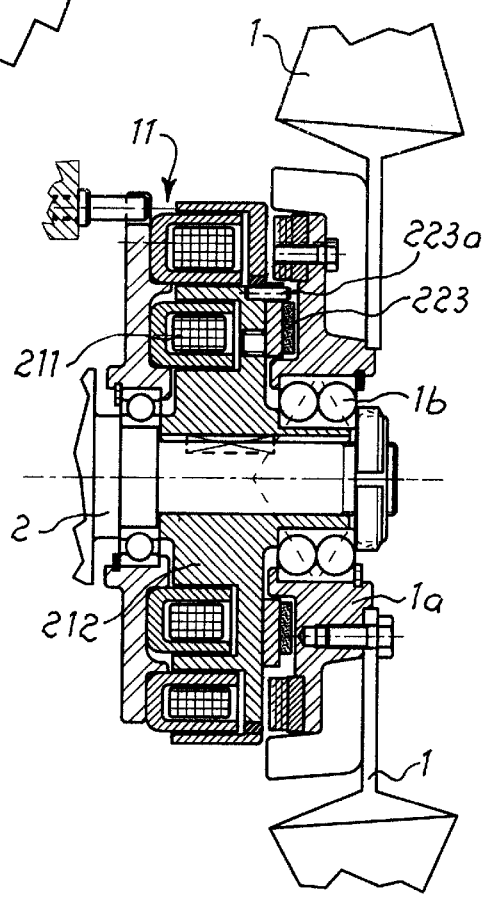

DEVICE FOR TRANSMITTING THE MOVEMENT FOR MOTOR-VEHICLE FANS WITH A FRONT-LINKAGE INDUCTION COUPLING

FIELD OF THE INVENTION

The present invention relates to a device for transmitting movement to fans for cooling the cooling liquid of motor vehicles, comprising a coupling of the electromagnetic type with front magnetic linkage and adjustable induction current.

BACKGROUND OF THE INVENTION

It is known that, in the technical sector relating to cooling and the cooling liquids contained in motor-vehicle radiators, there exists the need to force air onto the radiator itself in order to obtain more rapid dissipation of heat from the liquid to the exterior, said forced-air flow being obtained by causing rotation of a fan which is normally mounted either on the shaft of the water pump or on a driven shaft carrying a pulley which receives movement from a belt actuated by the crankshaft.

It is also known that said fan must be made to rotate only when a certain predefined temperature of the water is reached, said temperature being detected by means of a thermostat which actuates an electromagnetic clutch, closing of which starts rotation of the fan.

Such electromagnetic clutches have the drawback, however, that they start rotation of the fan at the speed of rotation of the actuating pulley, without the possibility of varying the speed of rotation of the fan depending on a desired variation in operating speed of the latter.

More particularly, a motor-vehicle fan should be able to rotate:
- at a lower speed than the speed of the drive shaft for cooling in conditions where there is a low external temperature;
- at a speed equal to or even greater than that of the drive shaft in the case of higher external temperatures or use in demanding conditions which cause overheating of the engine;
- at zero speed or with a fan which does not rotate at all or which remains in an idle condition with respect to the drive shaft, in the case of particularly low temperatures at which further cooling is of no use or even damaging.

In an attempt to obtain these performance characteristics, couplings of the mixed type with electromagnetically operated friction clutches and drive couplings based on the use of parasitic currents generated by the rotation of a conducting element in the vicinity of permanent magnets have been developed.

This solution is, for example, known from DE 32 03 143 which describes an arrangement in which the crankshaft is connected to the rotor of an electromagnetic clutch to which an armature connected to the fan for direct drive is coupled, whereas, for slow speeds, the engagement between a conducting disc, rotating together with the drive shaft, and the permanent magnets integral with the fan is used, said engagement causing transmission of movement at a slow speed on account of the relative slippage between the two parts.

With this solution, however, it is not possible to obtain either the idle (stopped) condition of the fan or a speed which is greater than that of the drive shaft.

In order to overcome these drawbacks, EP-0 317 703 describes a coupling which, re-applying the solution of the prior publication DE-32 03 143, also envisages a second electromagnetic clutch which, in combination with the other ones, is able to achieve three different operating conditions, but not a speed of the fan greater than that of drive shaft.

Both the solutions also have a structural limitation due to the fact that the slow speed is predefined by the size of the electromagnet forming the operating system for the clutch and it is therefore not possible to regulate the slow speed of rotation of the fan in a variable range corresponding to the actual temperature conditions of the engine.

OBJECTS OF THE INVENTION

It is an object of the invention to provide a device for transmitting the rotational movement to a fan cooling the cooling liquid of motor vehicles, which is operated by a single operating means and which allows the fan to run with a number of revolutions which can be controlled and adjusted according to the actual cooling requirement of the engine, which also includes the possibility of keeping the fan stopped in the case of very low external temperatures.

A further object is to provide such a device which can be controlled by means of direct detection of the temperature of the cooling liquid and allow selection of both manual and automatic operation.

SUMMARY OF THE INVENTION

These technical problems are solved according to the present invention by a device for transmitting the movement to a fan cooling the cooling liquid of a motor vehicle, which is integral with a support element and which comprises a coupling of the electromagnetic type with front linkage and adjustable induction current.

BRIEF DESCRIPTION OF THE DRAWING

The above and other objects, features, and advantages will become more readily apparent from the following description, reference being made to the accompanying drawing in which:

FIG. 1 is a schematic axial section through the device for transmitting movement to the fan according to the present invention with an asynchronous type induction coupling;

FIG. 2 is a cross-section along the plane indicated by II—II in FIG. 1, illustrating the arrangement of the front pole shoes of the rotor of the coupling according to FIG. 1;

FIG. 3 is a cross-section along the plane indicated by III—III in FIG. 1, illustrating the arc of conducting material;

FIG. 4 is a schematic axial section through the device for transmitting the movement to the fan according to the present invention with a synchronous-type induction coupling;

FIG. 5 is a cross section along the plane indicated by V—V in FIG. 4, illustrating the arrangement of the front pole shoes of the rotor of the coupling according to FIG. 4;

FIG. 6 is a cross section along the plane indicated by VI—VI in FIG. 5, illustrating the associated disc of conducting material;

FIG. 7 is a cross-section similar to that of FIG. 1 of another embodiment of the device according to the invention;

FIGS. 8a and 8b are cross-sections similar to that of FIG. 1 of a further embodiment of the device according to the invention;

SPECIFIC DESCRIPTION

Figure 9A:
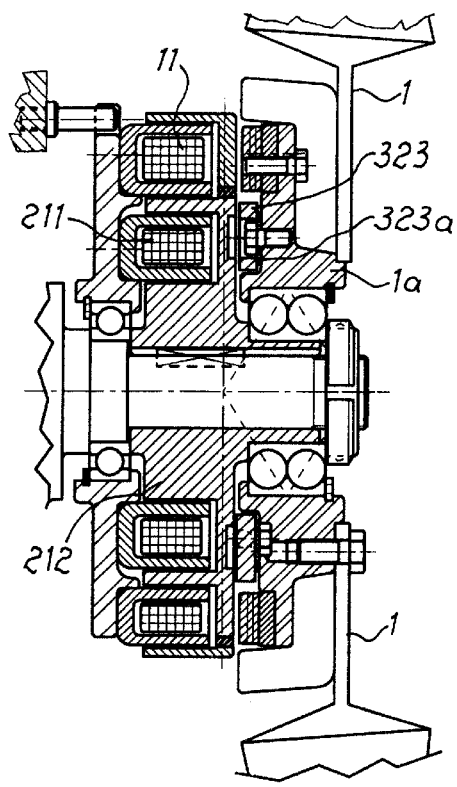
FIGS. 9a and 9b are cross-sections similar to that of FIG. 1 of a further embodiment of the device according to the invention.

As shown in FIG. 1, the device for transmitting movement to a cooling fan 1 for motor vehicles is arranged between the fan itself and an actuating shaft 2 and, for the sake of convenience of the description, the longitudinal direction will be understood as being that direction which is parallel to the longitude axis of the actuating shaft 2, i.e. the axial direction.

The fan 1 is in turn joined to a plate la mounted on the shaft 2 by means of a bearing 1b.

In a first embodiment, the transmission device comprises an induction coupling 10 consisting of an electromagnet 11 formed by an annular coil 11a inserted inside an annular, c-section soft-iron support 11b joined to an associated disc 11c concentrically mounted on the shaft 2 via a bearing 11d; the disc 11c and the coil 11a are therefore idle with respect to the shaft 2 and kept rotationally fixed by means of a pin 11e arranged in the longitudinal direction and integral with the engine casing.

The coil 11a may be supplied with current regulated externally for example by means of a potentiometer of equivalent control circuit 100 (indicated by broken lines in FIG. 1).

The shaft 2 also has, coaxially mounted on it, a rotor 12 formed by a central body 12a, locked in rotation with the shaft 2 itself, and by a radially peripheral part 13 substantially in the form of an inverted "L" which forms together with the body 12a a seat 13a designed to contain partially the electromagnet 11.

In greater detail (FIG. 2), the longitudinal arm 13b and the radial arm 13c of the "L" are made of magnetizable material and the internal edge of the radial arm 13c is shaped with shoes 13d extending radially towards the axis of rotation at regular angular intervals.

Said radial shoes 13d therefore define a corresponding number of radial seats 13e which allow engagement with corresponding radial shoes 12d and seats 12e in the central body 12a of the rotor 12.

The engagement between the two parts is achieved by means of a bead of insulating material 14 applied for example by means of braze-welding.

The inducting coupling 10 is completed by a ring 15 of conducting material, such as copper; the thickness of the ring must be such as to prevent contact with the rotor 12, with respect to which, however, it must be kept at a minimum distance in order to favor linkage of the flux lines of the magnetic field, as will emerge more clearly below.

In this way the rotor forms the front-linkage element of the induction coupling and its shoes 13d and 12d form respectively the N polarity (NORTH=+) and S polarity (SOUTH=−) thereof which produce magnetic induction of the asynchronous type with front linkage, able to cause rotation of the ring 15 and hence the fan 1.

The operating mode of the coupling is as follows:

a current is supplied to the electromagnet 11a, which generates parasitic currents which produce a magnetic field, the flux lines of which are linked to the ring 15;

at the same time rotation of the rotor 12, which rotates together with the shaft 2, produces the alternating passing movement of the polarities 12d (=N) and 13e (=S) inside the air gap between the electromagnet 11 and the ring 15, causing a variation in the flux which tends to cause the rotation, with it, of the conducting ring 15 and therefore the fan 1.

In this way since the ring 15 is driven with a certain slippage with respect to the rotor 12, the fan 1 will rotate in turn at a speed lower than that of the driving shaft 2.

By adjusting the excitation current of the electromagnetic 11 it is therefore possible to adjust the magnetic field induced and therefore the speed of rotation of the fan 1 which is able to pass from a stopped condition (current=0) to a full speed condition (current=MAX) passing through intermediate conditions which are basically adjustable with continuity by means of adjustment of the excitation current of the electromagnet which may be performed using very simple and low-cost devices 100 positioned at a distance from the device, but in the vicinity of the user who is able to perform manual adjustment, or else connected to programmed central control units which automatically adjust the speed of rotation of the fan on the basis of the real temperature conditions which occur during the various conditions of use.

FIGS. 4 to 6 show the synchronous embodiment of the induction coupling according to the invention in which the conducting ring 115 connected to the plate la of the fan 1, is formed by means of circular rim segments 115a arranged inside a pair of concentric discs 115b and 115c which short-circuit the said segments.

In this way each pair of radial shoes 13d and 12d of the rotor 12 corresponds to a single segment 115a of the conducting disc 115 and operation of the front-linkage coupling becomes synchronous.

FIG. 7 shows a variation of the asynchronous device according to the invention in which the electromagnet 111 is provided such that the annular C-shaped support 111b of the coil 111a has a permanent annular magnet 111g on the radial end wall.

In this embodiment the conducting ring 15 of the fan 1, is therefore always linked to the rotor 12 and the adjustment of its speed is performed by supplying current to the electromagnet 111 which, being excited, produces a magnetic field which tends to neutralize the permanent magnetic field.

Adjusting the strength of the current supplied to the electromagnet 111 causes a corresponding adjustment of the strength of the residual magnetic field and therefore the speed of rotation of the fan.

FIGS. 8a, 8b show a further of the asynchronous transmission device in which the induction coupling 11 is associated with an electromagnetic friction clutch 200.

More particularly the device has a rotor 212 with a second C-shaped seat 213 concentric with the preceding seat and designed to contain partially a second electromagnet 211, on the opposite side to the electromagnet 211, the rotor 212 has seats 220 designed to contain respective springs 221 which push against a disc 223 of friction material mounted on the rotor 212 by means of pins 223a.

In this way the disc 223 rotates together with the rotor, but is also able to perform a translatory movement towards/away from the disc la supporting the fan 1, in particular the disc 223 will always be pushed into contact with the ring 15 by the springs 221 (FIG. 8a) and will instead be detached from the ring 1a by the magnetic attraction produced by excitation of the electromagnet 211.

With this configuration it is possible to obtain a rotation of the fan with a number of rotations equivalent to that of the actuating shaft (electromagnets 11 and 211 de-energized) or a slower rotation with a continuously adjustable number of revolutions, in the case of the induction coupling 11 engaged and the friction clutch disengaged (electromagnets 11 and 211 energized).

Figure 9B:
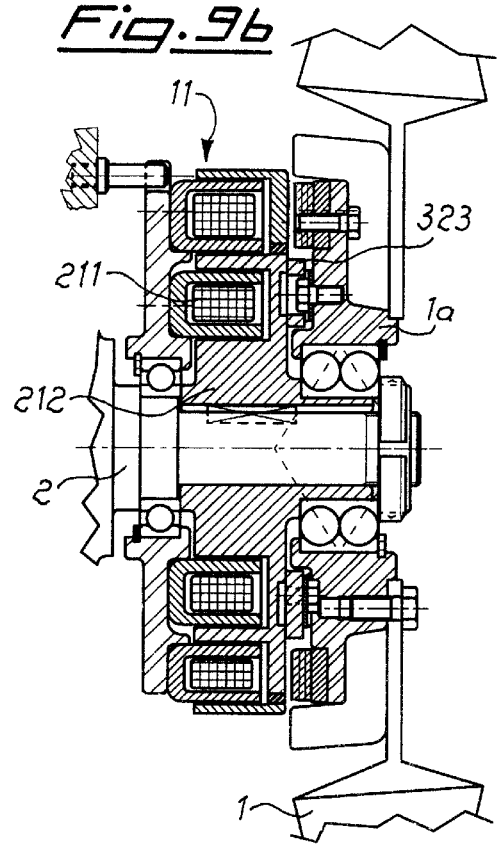

Similar operation occurs in the embodiments according to FIGS. 9a, 9b where the electromagnetic friction clutch 200 is formed by the electromagnet 211 and by an armature 323 connected to the support la of the fan 1 by means of a resilient element 323a, so that energization of the electromagnet 211 (FIG. 9a) causes recall of the armature 323 and direct-drive connection of the fan to the rotor 212, while de-engerization of the electromagnet 11 (FIG. 9a) allows rotation of the fan 1 at a slower speed than the rotor 212, but continuously adjustable by means of adjustment of the excitation current of the coil 11.

Figure 10:
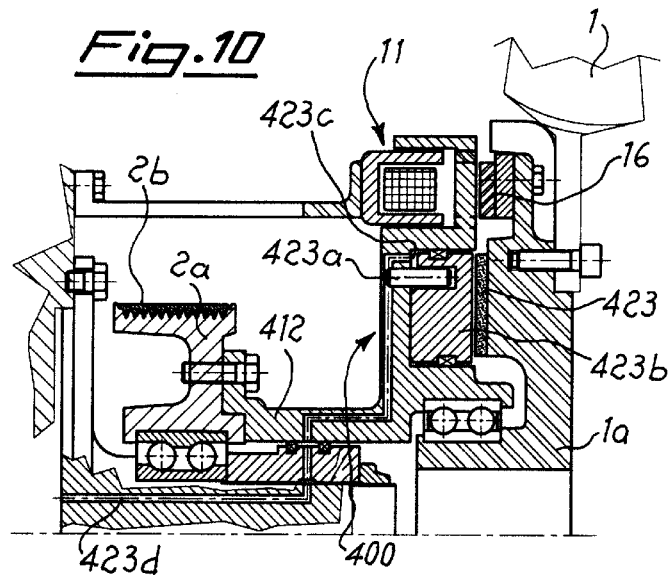
FIGS. 10 and 11 are cross-sections similar to that of FIG. 1 of yet another embodiment of the device according to the invention.

FIG. 10 shows a transmission device according to the invention in which the movement to the rotor 412 is transmitted by means of a pulley 2a actuated by a toothed belt 2b connected to a drive shaft (not shown). In addition to the induction coupling 11, 15, the device comprises a friction clutch 400 concentric with the induction coupling which comprises a disc 423 made of friction material integral with the support la of the fan 1 and a disc 423b rotationally integral with the rotor 412 with respect to which it may be translated towards/away from the disc 423 guided by pins 423a and as a result of the thrust of a fluid supplied into an associated chamber 423c via supply ducts 423d.

Figure 11:
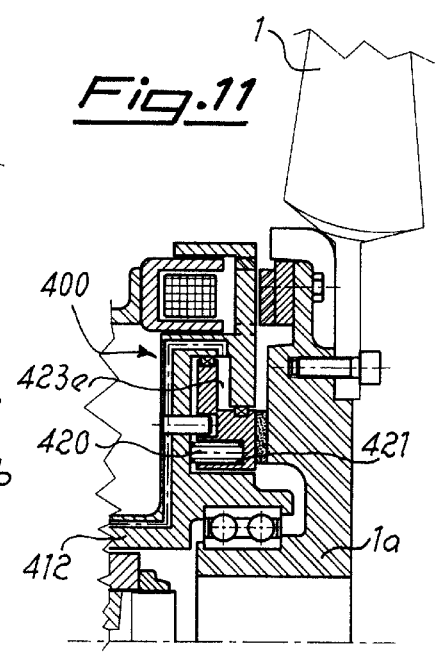

FIG. 11 shows a transmission device according to the present invention, similar to that of FIG. 10, in which the thrusting action on the disc 423b and therefore the engagement of the friction clutch 400 is performed by springs 421 housed in associated seats 420 of the rotor 412, while the thrusting action exerted by the fluid supplied to a chamber 423c causes the return movement of the disc 423 towards the rotor 412 and therefore disengagement of the friction clutch.

Figure 12:
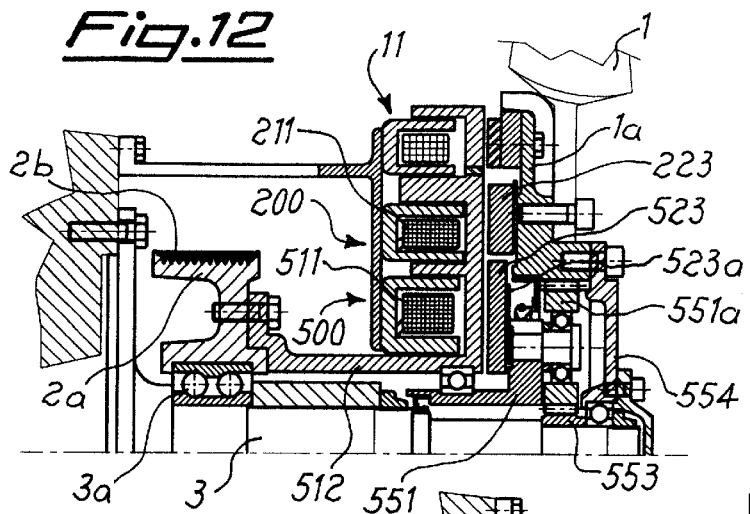
FIG. 12 is a cross-section similar to that of FIG. 1 of a further embodiment of the device according to the invention.

FIG. 12 illustrates a further variation of the transmission device according to the present invention, wherein the variable current front-induction coupling 11 is associated with a first electromagnetically engaging friction clutch 200 and a second electromagnetically engaging friction clutch 500 connected to the disc 1a supporting the fan 1 by means of a gearing of the epicyclic type 550.

More particularly, a fixed shaft 3 has, mounted on it, via bearings 3a, a pulley 2a which is made to rotate by a toothed belt 2b connected to a shaft of the vehicle engine.

The rotor 512 has three concentric seats 13a, 213a and 513a inside which the associated electromagnets 11, 211, 511 are housed.

The electromagnet 511 is designed to attract a respective armature 523 integral with a planet-wheels carrier 551 of the said epicyclic gearing 550, said armature 523 and said planet-wheels carrier 551 having between them a resilient membrane 523a designed to allow a displacement of the said armature in the axial direction.

As can be seen from the figure, said epicyclic gearing 550 is of the type with a sun wheel 553 fixed on the shaft 3, said sun wheel having, meshing on it, the planet wheel 551a carried by the associated planet-wheels carrier 551 and also meshing with the disc 1a, The epicyclic gearing 550, finally, is closed at the front by a cup 554 designed to keep the gearing sealed so as to avoid the leakage of lubricant.

The operating principle of the device is as follows:

in order to obtain a number of revolutions of the fan greater than the number of revolutions of the pulley 2a, the electromagnet 511 is energized so that the armature 523 is drawn towards the rotor 512 and engages rotationally with the latter; in this way the rotational movement is transmitted to the fan 1 by means of the planet-wheels carriers 551, the planet wheels 551a and the disc 1a, and the fan 1 therefore rotates, with respect to the pulley 2a, with a number of revolutions multiplied by a factor derived from the dimensions of the epicyclic gearing 550;

in order to obtain a speed of rotation of the fan equal to the speed of rotation of the pulley 2a, the electromagnet 511 is de-energized and the electromagnet 211 energized, thus drawing the armature 223 into engagement with the rotor 12; in these conditions the movement to the fan 2 is transmitted directly via the disc 1a and the fan therefore rotates with a number of revolutions substantially identical to that of the pulley 2a;

in order to obtain a speed of the fan which is less than the speed of the pulley 2a, both the electromagnets 511 and 211 are de-energized and the induction electromagnet 11 is also energized, this also allowing, as has already been seen, adjustment of the speed of the fan 1;

in order to obtain the condition where the fan is at a standstill, it is sufficient to disengage all the electromagnets 11, 211 and 511, disengaging completely the fan which, being mounted idle on the fixed shaft 3 is not able to rotate except by means of the connection to the pulley 2a.

Figure 13:
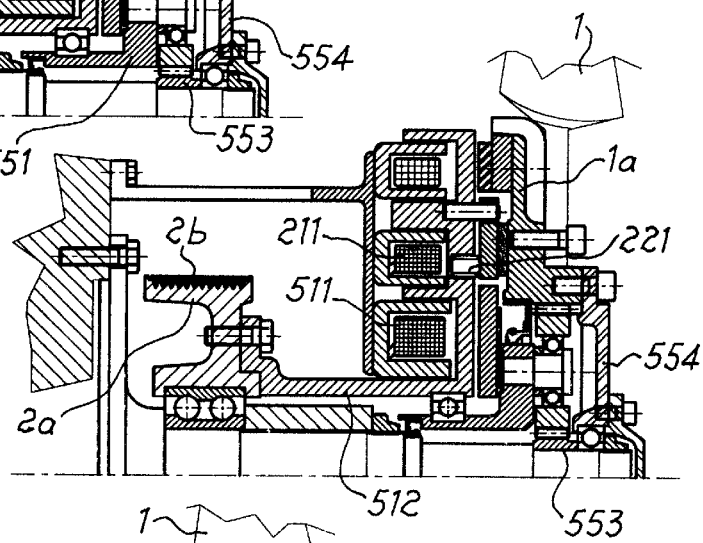
FIG. 13 is a cross-section similar to that of FIG. 1 of another embodiment of the device according to the invention.

FIG. 13 shows a constructional variation of the device according to FIG. 12 in which the engagement of the intermediate friction clutch producing direct-drive operation via the drive shaft is determined by the thrusting force of a spring 221, while the disengagement of the said clutch is determined by excitation of the coil 211 in a similar manner to that described in connection with FIG. 8a.

Figure 14:
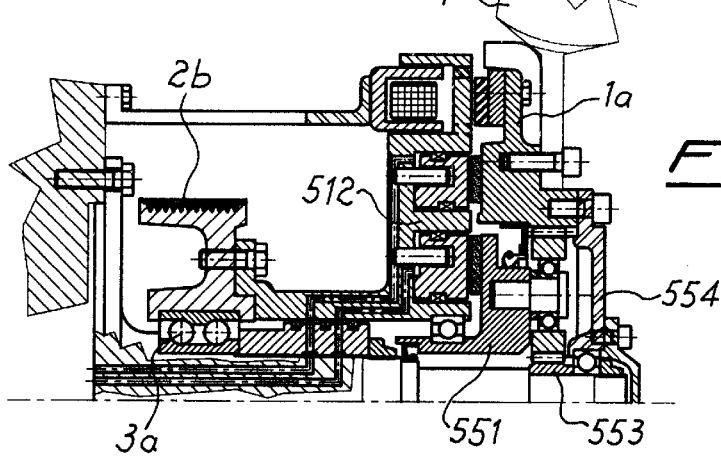
FIG. 14 is a cross-section similar to that of FIG. 1 of yet another embodiment of the device according to the invention.

In FIG. 14 it is envisaged that operation of the friction clutches is obtained by means of the thrusting force of a fluid supplied to corresponding chambers formed between the body of the rotor 512 and discs rotationally integral with the latter, but movable translation wise from/towards the latter in a similar manner to that described and illustrated in FIG. 10.

Figure 15:
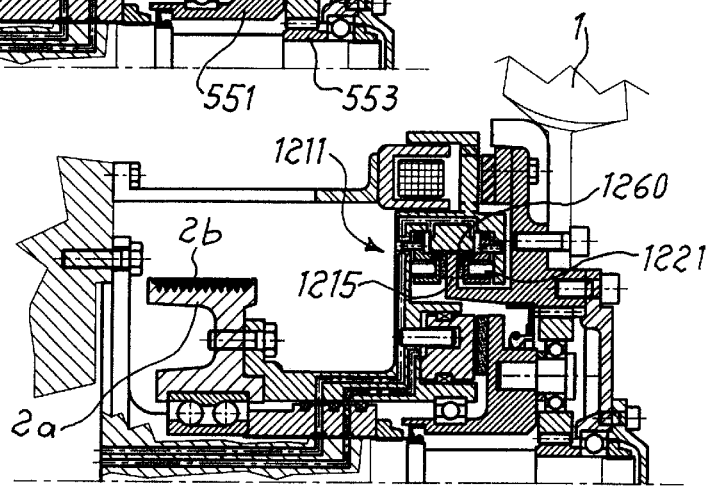
FIG. 15 is a cross-section similar to that of FIG. 1 of still another embodiment of the device according to the invention.

FIG. 15 shows, on the other hand, an embodiment similar to that of FIG. 14, in which the intermediate friction clutch 1211 effects the connection of the fan 1 to the rotor 1512 by means of jaws 1260 arranged symmetrically on opposite sides of a radial extension 1215 of the support la of the fan 1 and gripped around said extension but the thrusting action of springs 1221 which react on the rotor 1212.

With this configuration it is possible to avoid the axial thrusts which are exerted by the intermediate clutch 1211 on the support la which in turn exerts a moment on the support bearing of the epicyclic gearing, reducing the life thereof.

All the configurations described which envisage the engagement of friction clutches by means of springs essentially ensure safety conditions which result in rotation of the fan, and therefore cooling, also in the event of an electrical fault which prevents correct supplying of the various control circuits.

What is claimed is:

1. A fan drive assembly for a cooling system of a motor vehicle, said assembly comprising:

a rotating shaft;

a fan mounted on said shaft and rotatable relative thereto;

an electromagnetic coupling on said shaft for entraining said fan with said shaft, said electromagnetic coupling comprising:
a conductive ring coaxial with said shaft and connected to said fan,
a rotor keyed to said shaft and provided with an annular variably magnetizable member juxtaposed with said ring, and
a nonrotating electromagnetic coil surrounding said shaft, juxtaposed with said annular variably magnetizable member and partially enclosed thereby whereby said annular variably magnetizable member is magnetized solely by said coil to produce eddy currents in said ring and magnetically couple said ring with said annular variably magnetizable member for joint rotation; and a control connected to said coil for regulating current flow therethrough, thereby regulating a degree of magnetic coupling of said ring and said annular variably magnetizable member, said rotor including a central body carrying said member, said member being of an inverted-L cross section and having a peripheral portion coaxially surrounding said coil, said central body having radial shoes at regular angular intervals and a corresponding number of seats, said member having a radially extending portion with shoes extending radially toward an axis of rotation of said shaft and defining a corresponding number of seats for engagement with said shoes of said central body.

2. The fan drive defined in claim 1 wherein said shoes and seats of said member are connected to the seats and shoes of said central body by a bead of insulating material.

3. The fan drive defined in claim 2 wherein said electromagnetic coupling is of an synchronous type.

4. The fan drive defined in claim 1 wherein said ring is a continuous ring.

5. A fan drive assembly for a cooling system of a motor vehicle, said assembly comprising:

a rotating shaft;

a fan mounted on said shaft and rotatable relative thereto;

an electromagnetic coupling on said shaft for entraining said fan with said shaft, said electromagnetic coupling comprising:
a conductive ring coaxial with said shaft and connected to said fan,
a rotor keyed to said shaft and provided with an annular variably magnetizable member juxtaposed with said ring, and
a nonrotating electromagnetic coil surrounding said shaft, juxtaposed with said annular variably magnetizable member and partially enclosed thereby whereby said annular variably magnetizable member is magnetized solely by said coil to produce eddy currents in said ring and magnetically couple said ring with said annular variably magnetizable member for joint rotation; and a control connected to said coil for regulating current flow therethrough, thereby regulating a degree of magnetic coupling of said ring and said annular variably magnetizable member, said electromagnetic coupling being a synchronous coupling, said ring comprising a plurality of circular rim segments circuited by a first ring radially outwardly of said segments and by a second ring radially inwardly of said segments.

6. A fan drive assembly for a cooling system of a motor vehicle, said assembly comprising:

a rotating shaft;

a fan mounted on said shaft and rotatable relative thereto;

an electromagnetic coupling on said shaft for entraining said fan with said shaft, said electromagnetic coupling comprising:
a conductive ring coaxial with said shaft and connected to said fan,
a rotor keyed to said shaft and provided with an annular variably magnetizable member juxtaposed with said ring, and
a nonrotating electromagnetic coil surrounding said shaft, juxtaposed with said annular variably magnetizable member and partially enclosed thereby whereby said annular variably magnetizable member is magnetized solely by said coil to produce eddy currents in said ring and magnetically couple said ring with said annular variably magnetizable member for joint rotation; and a control connected to said coil for regulating current flow therethrough, thereby regulating a degree of magnetic coupling of said ring and said annular variably magnetizable member, a friction clutch between said rotating shaft and said fan and concentric with said ring, said friction clutch comprising an electromagnetic coil at least partially housed in a respective seat in said rotor.

7. The fan drive defined in claim 6 wherein said electromagnetic coil of said clutch disengages the clutch by drawing a friction element away from a support of said fan against a force of a resilient means reacting against said rotor.

8. The fan drive defined in claim 6 wherein said electromagnetic coil of said clutch engages the clutch by drawing a friction element joined to a support of the fan by a resilient membrane.

9. A fan drive assembly for a cooling system of a motor vehicle, said assembly comprising:

a rotating shaft;

a fan mounted on said shaft and rotatable relative thereto;

an electromagnetic coupling on said shaft for entraining said fan with said shaft, said electromagnetic coupling comprising:
a conductive ring coaxial with said shaft and connected to said fan,
a rotor keyed to said shaft and provided with an annular variably magnetizable member juxtaposed with said ring, and
a nonrotating electromagnetic coil surrounding said shaft, juxtaposed with said annular variably magnetizable member and partially enclosed thereby whereby said annular variably magnetizable member is magnetized solely by said coil to produce eddy currents in said ring and magnetically couple said ring with said annular variably magnetizable member for joint rotation; and a control connected to said coil for regulating current flow therethrough, thereby regulating a degree of magnetic coupling of said ring and said annular variably magnetizable member, said friction clutch being of a hydraulically actuatable type.

10. The fan drive defined in claim 9 wherein said friction clutch is provided with resilient members displacing the clutch into engagement and is hydraulically disengageable.

11. The fan drive defined in claim 6, further comprising a further friction clutch concentric with said electromagnetic coil.

12. The fan drive defined in claim 6 wherein said friction clutch comprises a friction element connected to a support of said fan by an epicyclic gearing.

13. The fan drive defined in claim 12 wherein said epicyclic gearing has a support wheel fixed on a support shaft, a friction element on a planet wheel carrier and planet wheels meshing with a part of the fan.

14. A fan drive assembly for a cooling system of a motor vehicle, said assembly comprising:

a rotating shaft;

a fan mounted on said shaft and rotatable relative thereto;

an electromagnetic coupling on said shaft for entraining said fan with said shaft, said electromagnetic coupling comprising:

a conductive ring coaxial with said shaft and connected to said fan, a rotor keyed to said shaft and provided with an annular variably magnetizable member juxtaposed with said ring, and a nonrotating electromagnetic coil surrounding said shaft, juxtaposed with said annular variably magnetizable member and partially enclosed thereby whereby said annular variably magnetizable member is magnetized solely by said coil to produce eddy currents in said ring and magnetically couple said ring with said annular variably magnetizable member for joint rotation; and a control connected to said coil for regulating current flow therethrough, thereby regulating a degree of magnetic coupling of said ring and said annular variably magnetizable member, an intermediate clutch being provided and being engaged by jaws pushed against a radial extension on said fan by resilient members reacting against the rotor.

15. The fan drive defined in claim 14 wherein said clutch is of a hydraulically disengaging type.

* * * * *